United States Patent
Shono et al.

(10) Patent No.: US 6,473,448 B1
(45) Date of Patent: Oct. 29, 2002

(54) SPREAD SPECTRUM SIGNAL GENERATION METHOD, SPREAD SPECTRUM SIGNAL GENERATOR, STREAM ENCRYPTION METHOD, AND STREAM ENCIPHERED CODES COMMUNICATION METHOD

(75) Inventors: Katsufusa Shono, Kanagawa-ken; Tetsuya Ishihara, Shizuoka-ken, both of (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/512,317

(22) Filed: Feb. 24, 2000

(30) Foreign Application Priority Data

Feb. 25, 1999 (JP) .......................................... 11-048958

(51) Int. Cl.[7] ................................................ H04B 1/69
(52) U.S. Cl. ...................................... 375/130; 380/270
(58) Field of Search ................................. 375/130, 135, 375/136, 146, 147, 258; 380/270, 255; 370/320, 335, 342, 321

(56) References Cited

U.S. PATENT DOCUMENTS 6,097,817 A * 8/2000 Bilgic et al. ................ 380/247

* cited by examiner

*Primary Examiner*—Chi Pham
*Assistant Examiner*—Khai Tran
(74) *Attorney, Agent, or Firm*—Finnegan, Henderson, Farabow, Garrett, & Dunner, L.L.P.

(57) ABSTRACT

Arithmetic operation is started by substituting an initial value x(0) for a logistic mapping $x(t+1)=4x(t)\{1x(t)\}$ which is a symmetrical nonlinear mapping. The resultant value is again input into the logistic mapping $x(t+1)=4x(t)\{(1-x(t)\}$, based on an feedback $x(t)=x(t+1)$. This operation is repeated to obtain time series x(t)–t. Isomorphic transform and quantization corresponding to the time series x(t)–t is obtained based on $y(t)=[\{2/\pi \cdot \arcsin \sqrt{0x(t)}\} \cdot 2^n]$ while a quantizing resolution n=1 is substituted for $y(t)=[\{2/\pi \cdot \arcsin \sqrt{0x(t)}\} \cdot 2^n]$. A time series y(t)–t is determined from the obtained isomorphic transform and quantization. A spread spectrum signal having, as a period thereof, binary code sequence y(t) arbitrarily sampled from the time series y(t)–t is generated.

4 Claims, 2 Drawing Sheets

FIG.2

BINARY TIME SERIES WHEN INITIAL VALUE X(0) = 0.3000 ⋯ (2000BITS)

0111000101001100110010111101000110000011011011110110111011000010001011
1010101111000100111010111100001100110011111111110011101101000001111001
1101111100010111010111011010011011010101001010111000101010001011010100
1000110101011010000110111100101001001001011101011101010110110011100100
0101000110101110101100011101011100101000100110101011000110000101010100
1000101001001101101110110011011100110100010101110011011100000011101100
1011111100100001110001111011001001010110110010011100101010000100001100
0110000101100101100011111001101010000101110001000110101111110110011110
1110000001000110010110110010001100100110010110010000000001111111111010
0000100011110111101000100001000111011010101010011100011010100000101101
1011100000110010001011001001001100111010001000100000110100100000010000
0000010101001001101101000011111110001010111000001010110110100100111111
0010010011100001001111101000110010101100101110100000111001101001110111
0011110001011101111010111000101100100100011001111000101111110000111100
1100111000011110001110110000110001011110010100010111011011110001100011
0001111111100001101000010001001100100000011100011001101010011101001110
0010111010000000100011110011110000000001100000100111100111110010001110
0100101101110011000100100010001110010010001110010011000111110101111100
0101101110001011000001000011000110100000000010100110111111111111011100
0100100011001011110010110000111100001010000101011110100000110101100111
0010010010010000110011100100001011010100111000110110001001011011000011
1111100001111111001011111111100000111010110111010101111100111000100110
1001000010011001010100010001100101110011011111101000011111101101000010
1110001111100010011001101010011101001010110011011001001111001010000 10
0111111001110001010111000001001011110000111010111000000101010000100
1111101001001110101110011010011001001011100100111010100001111000 1000
0101011010000111110111110010010010111010001110100011101101000100110100
1100001100011100110001011110101010100111111010000101111111000100 1001
1111001111100100011011011101111010001

SPREAD SPECTRUM SIGNAL GENERATION METHOD, SPREAD SPECTRUM SIGNAL GENERATOR, STREAM ENCRYPTION METHOD, AND STREAM ENCIPHERED CODES COMMUNICATION METHOD

BACKGROUND OF THE INVENTION

1. Field of the Invention

The present invention relates to a spread spectrum signal generation method of and a spread spectrum signal generator for generating a chaos sequence as a spread spectrum signal.

The invention also relates to a stream encryption method where stream encryption is performed by using a binary code sequence according to the method and the generator.

The invention relates further to a stream enciphered codes communication method where communication is performed by using a cipher code obtained by the stream encryption method.

2. Description of the Related Art

As the digital high-speed communication spreads, it is desirable to implement a code division multiple access (CDMA) communication system using a spread spectrum communication system. In this field of endeavor, a binary number sequence generated by tossing a coin, is considered ideal as a spread spectrum signal (hereinafter called 'SS signal').

In conventional application to the spread spectrum communication system, a sequence obtained by cutting, in suitable length, a maximum length sequence, a Kasami sequence, Gold sequence or the like, is used as the SS signal. A maximum length sequence generated from multi-staged shift registers is also used.

However, conventional spread spectrum code sequences to be used conventionally as SS signal are limited in kinds, and may be insufficient to cope with expectable future demands for communications.

For example, for a sufficient secrecy to be secured for communications, it is necessary to avoid a so-called see-through state of an original text. To be so, an SS signal having a periodical temporal sequence suppressed of auto-correlation as well as of cross-correlation is desirable. It however is difficult for the conventional concept of generation to provide a periodical temporal sequence suppressed in auto-correlation and cross-correlation, with a good repeatability.

To this point, the present inventors paid attention to a chaos containing whole frequency components and capable of generating a sequence of integers complicated of combination (with a binary code sequence inclusive, and hereinafter called 'chaos sequence'), and have carried forward a concentrated research to make use of a chaos sequence for SS signal generation, reaching a new object as mentioned below.

That is, because a desirable binary code sequence for use as an SS signal should be free of inclination between numbers of '0's and '1's, it has come up as an object to be solved how to generate an SS signal in the form of a chaos sequence meeting such a requirement.

SUMMARY OF THE INVENTION

The present invention has been made to give solution to the object described and it is an object of the invention to provide a spread spectrum signal generation method and a spread spectrum signal generator which can generate, from a binary code sequence of a chaos sequence, an SS signal free of inclination between numbers of '0's and '1's Another object of the invention is to provide a stream encryption method which employs a binary code sequence determined by a novel spread spectrum signal generation method disclosed herein, for a stream encryption to be executed to thereby generate a cipher code to be optimum in use, for example, for communications and very high secrecy.

A still another object of the invention is to provide a stream cipher communication method which employs a cipher code, determined by a novel stream encryption method disclosed herein, for stream cipher communications to be performed to thereby implement a stream cipher communication with very high secrecy.

To achieve the object described above, there is provided a spread spectrum signal generation method comprising the steps of: starting an operation by substituting an initial value $x(0)$ to an expression (1), having a resultant value based on an expression (2) again as an input to the expression (1), determining a time series $x(t)$–$t$ by repeating such operations; and, substituting a quantization resolution $n=1$ to an expression (3), determining an isomorphic transform and quantization based on the expression (3) in correspondence to the time series $x(t)$–$t$, determining a time series $y(t)$–$t$ from the determined isomorphic transform and quantization, generating a spread spectrum signal having, as a period thereof, a binary code sequence $y(t)$ arbitrary cut out of the time series $y(t)$–$t$, where Logistic mapping: $x(t+1)=4x(t)\{1-x(t)\}$ (1), Feedback: $x(t)=x(t+1)$ (2), and Isomorphic transform and quantization:

$y(t)=[\{2/\pi \cdot \arcsin \sqrt{0}x(t)\} \cdot 2^n]$ (3), where, t is a discrete time, $x(t)$ is an internal state of a chaos given as a real number with double-precision normalized between '0' and '1', and [ ] is an operator representing a round-off operation of a decimal fraction of a value in the [ ].

According to the invention, there can be provided a concrete method of obtaining, from a logistic mapping as a symmetrical nonlinear mapping and a basic mode (n=1) of a nonlinear quantization observation, multiplicity of binary code sequences free of bias, to generate SS signal which is most suitable in use for CDMA multiple communications.

To achieve the object described above, there is provided a spread spectrum signal generator comprising: a program storage unit for storing a program for execution of operations depending on expressions (1) to (3), Logistic mapping: $x(t+1)=4x(t)\{1-x(t)\}$ (1), Feedback: $x(t)=x(t+1)$ (2), and Isomorphic transform and quantization:

$y(t)=[\{2/\pi \cdot \arcsin \sqrt{x(t)}\} \cdot 2^n]$ (3)

where, t is a discrete time, $x(t)$ is an internal state of a chaos given as a real number with double-precision normalized between '0' and '1', and [ ] is an arithmetic operator representing a round-off operation of a decimal fraction of a value in the [ ], a database for storing a quantization resolution $n=1$ and an initial value $x(0)$; and an arithmetic processing unit for starting an operation by substituting to the expression (1) the initial value x(0) stored in the database, having a resultant value based on the expression (2) again as an input to the expression (1), determining a time series x(t)–t by repeating such operations, substituting to the expression (3) the quantization resolution n=1 stored in the database, determining an isomorphic transform and quantization based on the expression (3) in correspondence to the time series x(t)–t, determining a time series y(t)–t from the determined isomorphic transform and quantization, generating a spread spectrum signal having, as a period thereof, a binary code sequence y(t) arbitrarily cut out of the time series y(t)–t.

According to the invention, a spread spectrum signal generator to be implemented in particular as a hardware chip such as a general purpose industrial CPU outputs binary code sequence y(t) determined when the quantization resolution n=1 as spread spectrum signal as necessary.

When the internal state x(t) of chaos ideally including waves having all frequencies is quantized as integer sequence and then observed, $2^n$ combinations of integer sequence is generated in time series where n is a quantizing resolution. At this time, if the observation is performed while a non-liner mapping is linearly quantized, the distribution of integers to be taken out has bias.

On the other hand, logistic mapping: $x(t+1)=4x(t)\{1-x(t)\}$ is an ideal and representative mathematical model of low-division chaos. Isomorphic transform and quantization: $y(t)=[\{2/\pi \cdot arc \sin \sqrt{x(t)}\} \cdot 2^n]$ for the logistic mapping generates almost flat distribution of integers from 0 to $2^n$ when long observation is performed, and does not generate a peculiar bias. It is to be noted that, in he expression, [ ] is an arithmetic operator representing a round-off operation of a decimal fraction of a value in the [ ].

In case of random numbers, the frequency distribution appears to be flat when a long and repeated observation is performed. In contrast, in case of a chaos, the distribution variously changes depending on the way of cutting out, because the initial sensibility thereof always remains.

Therefore, according to the present invention, resolution of quantization observation is set to be n=1 and the binary code sequence y(t) is output as binary code sequence as it is, thereby generating a time series which serves as a base for a SS signal. The time series obtained when the calculation of the logistic mapping and the feedback thereof is performed with double-precision depends on the initial value x(0) and has repeatability which is not affected by OS and hardware.

The initial value x(t) is given a real number with double-precision between '0' and '1' except for '0', '0.5' and '1'. Therefore, the number of available initial values is equivalent to its precision, i.e. double-precision and thus almost infinite in view of industrial applicability.

There is no limitation with respect to the length of the calculation of the time series. Since there is generated an SS signal having, as a period thereof, binary code sequence y(t) obtained by cutting the time series y(t)–t by a certain length, the kinds of the binary code sequence y(t) are enough.

Further, to achieve the object as described above, there is provided a stream encryption method capable of obtaining enciphered code by performing stream encryption using the binary code sequence obtained by the above spread spectrum signal generation method, wherein the stream encryption is achieved by executing an exclusive OR arithmetic operation on the binary code sequence that has been obtained by the spread spectrum signal generating method according to claim 1 and digital information to be enciphered.

According to the present invention, it is possible to propose a stream encryption method capable of generating ciphered codes with very high secrecy, which is most suitable for using in communication for example.

Further, to achieve the object as described above, there is provided a stream enciphered codes communication method for performing stream enciphered code communication using enciphered codes obtained by the above stream encryption method.

According to the present invention, it is possible to realize the asynchronous multiple multi user stream cipher communication with very high secrecy. More specifically, the invention exhibits extremely excellent effect that the encryption code is generated, enhanced, mixed and converted, and a user having the same spread spectrum signal generator reconstitute this code through synchronization.

It is to be noted that, for the purpose of generating enciphered codes with wider spread and easily perform multiplication, it is preferable to perform calculation with the ratio of the SS signal to digital information of from several times to tens of times instead of 1:1.

When the binary time series {y(t)–t} depending on an initial value is arbitrarily sampled out to prepare many SS signals composed of the binary code sequences y(t) and then stream enciphered codes for digital information are deciphered according to the SS signal, it is possible to perform perfect decryption only by executing synchronized exclusive OR (EXOR) operation.

Further, even when the decryption is asynchronously performed by shifting synchronization of the SS signal, the original text can not be seen or recognized through. Furthermore, even when the original text is English or Japanese sentences composed of ASCII codes and the data spreading ratio is 1, the characters and the words can not be seen or recognized through. The stoutness of encryption is further strengthened when the spreading ratio is selected as from several times to tens of times.

With regard to the safety of the SS signal, the similarity of arrangement of '0' and '1' in an SS signal and the similarity of arrangement of '0' and '1' between SS signals are valued through calculation of auto-correlation coefficients and cross-correlation coefficients. The valuations include not only one for non-similarity in an asynchronous state but also one in a perfect synchronous state.

Any SS signal obtained by cutting a time series generated based on any initial value may be used for spread spectrum communication. The assurance of such independence of the SS signal is derived from or based on the nature of chaos which includes sensitivity for an initial value, impossibility of prediction for a long time, and the divergence and convergence depending on Lyapunovs index.

The nature, principle and utility of the invention will become more apparent from the following detailed description when read in conjunction with the accompanying drawings.

DETAILED DESCRIPTION OF THE PREFERRED EMBODIMENTS

Figure 1:
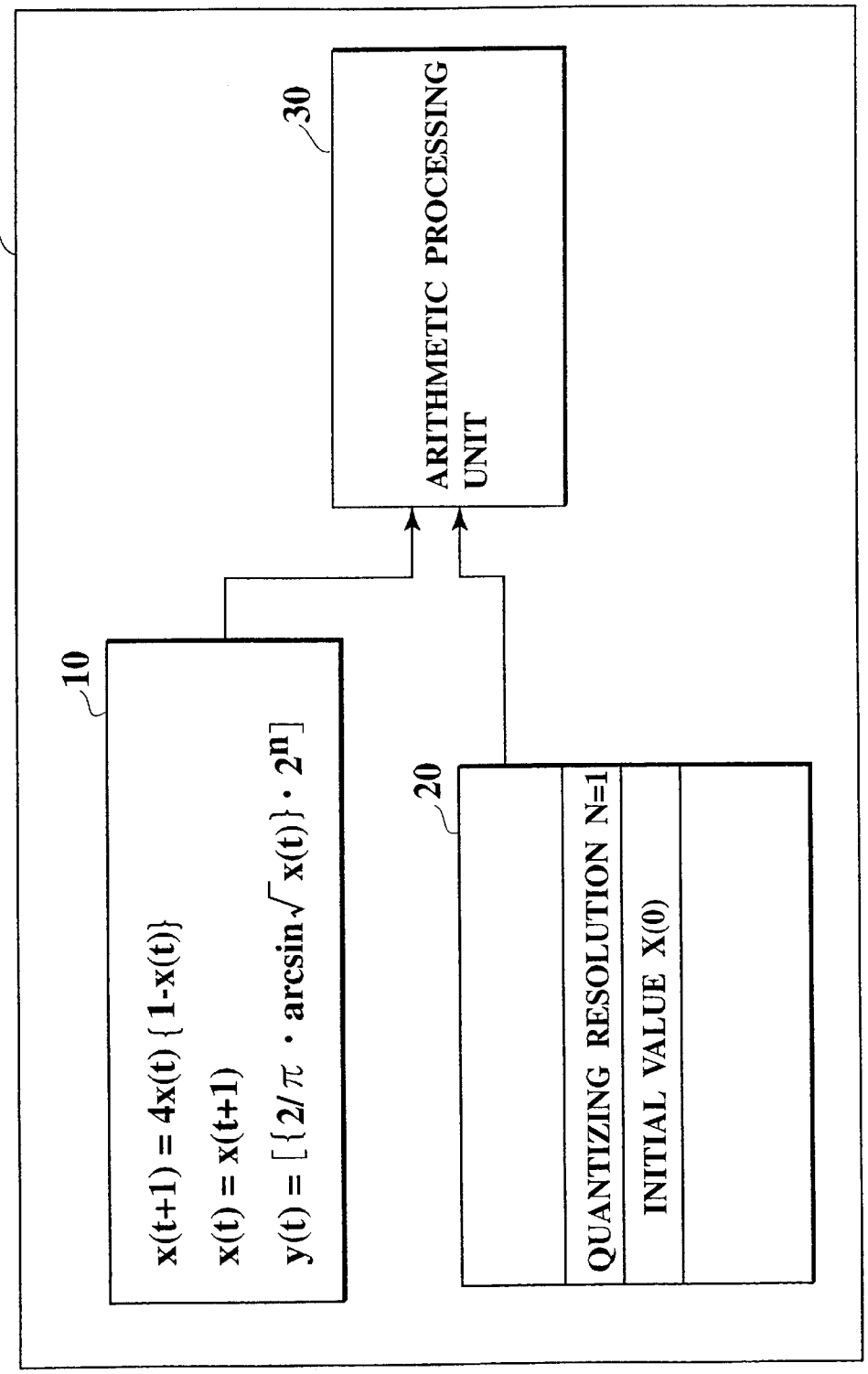
FIG. 1 is a block diagram of the spread spectrum signal generator according to the present invention; and, FIG. 2 is a binary time series of an SS signal generated by the method of the spread spectrum signal generation relating the invention.

An embodiment of the invention will be explained below with reference to the drawings.

FIG. 1 is a block diagram of a spread spectrum signal generator relating to the present invention.

A spread spectrum signal generator 1, relating to the present invention has a program storage unit 10, a database 20 and arithmetic processing unit 30.

The program storage unit 10 which has stored a program to execute an arithmetic operation based on expressions (1) to (3), where Logistic mapping: $x(t+1)=4x(t)\{1-x(t)\}$ (1), Feedback: $x(t)=x(t+1)$ (2), and Isomorphic transform and quantization:

$y(t)=[\{2/\pi \cdot \arcsin \sqrt{x(t)}\} \cdot 2^n]$ (3).

In the above expressions (1) to (3), t is a discrete time, x(t) is an internal state of a chaos given as a real number with double-precision normalized between '0' and '1'. The expression (1) is a symmetrical nonlinear mapping function. Further, [ ] is an arithmetic operator, representing a round-off operation of a decimal fraction of a value in the [ ].

The database 20, which has stored at least quantization resolution n=1, and an initial value x(0).

The arithmetic processing unit 30 carries out the following operation based on the program stored in the program storage unit 10 and the data stored in the database 20.

The arithmetic processing unit 30 starts the operation by substituting the initial value x(0) for an expression (1). The expression (2) means that the result (output) that is determined by the expression (1) is used again by the expression (1) as an input. That is, arithmetic operation based on an expression (1) is carried out repeatedly, and the time series x(t)–t can be determined by the repetition of those arithmetic operations.

Then, the arithmetic processing unit 30 substitutes in the expression (3) the quantization resolution n=1, which has been stored in the database 20. Based on the substituted expression (3), isomorphic transform and quantization in correspondence to the time series x(t)–t is determined. Then, time series y(t)–t is determined by the isomorphic transform and quantization thus determined. Then, the arithmetic processing unit 30 generates spread spectrum signal having, as a period thereof, binary code sequence y(t) optionally cut out of the time series y(t)–t.

FIG. 2 shows an example of an SS signal that is generated by using the spread spectrum signal generator and the method therefor according to the present invention.

FIG. 2 shows a binary code sequence (y)t of 2000 bits from y(0) to y(1999) determined by using the spread spectrum signal generator and a method therefor with an initial value set as x(0)=0.300 . . . In FIG. 2, the binary code sequence y(t) outputted in the order of discrete time t is shown, which time t is not shown therein.

For example, it may be assumed that an SS signal having a period of 160 bit is segmented. It is noted that the 160 bit period is only one embodiment arbitrarily selected. When counting '0' and '1' in the period of the SS signal number, a 160 bit period is selected as a length with which the number of '0' is equal to that of '1'.

The basis which decides the period of the SS signal is '0' or '1' continuing distribution. In FIG. 2, the rate at which '0' or '1' is isolated as 1 bit is about 20%. Also, the rate of a continuation of two '0's or '1's, namely, '00' or '11' is about 15%. Further, the rate of a continuation of three '0's or '1's, namely, '000' or '111' is about 10%. Then, rate of a continuation of 5 or more is not more than 5%, but a continuation of up to seven '0's or '1's does exist.

While it is assumed that the period has 160 bits, both inclinations of the continuations of '0' and '1' is mutually compensated for each other. Due to this, the number of '0' amounts to about 80 and that of '1' amounts to almost 80, as well. Whether a longer or shorter period is selected depends on the requirements of system design.

Upon taking out 160 bit period as SS signal, from y(0) to y(159) are set as a period, and from y(160) to y(319) are set as another one. But this way of taking out 160 bit period is one example. If purposely taking out two periods so as to overlap each other, the correlation between them naturally increases due to such an overlap It is, therefor, preferable to avoid taking out the period which overlap each other.

An auto-correlation coefficient with respect to the obtained SS signal having the period of 160 bit is 160 where the phases agree with each other and is about ±0–30 where the phases do not agree with each other. It is not observable that synchronization is kept where the phases do not agree with each other, even including a case of reverse correlation. A cross-correlation coefficient is also about ±0–30. A correlation sum is about 500 to 900 with respect to both auto-correlation and cross-correlation. It is to be noted that '0' and '1' in the time series are assumed to be –1 and +1 respectively when the correlation coefficients are calculated.

When '0' or '1' is continuously connected seven times at the maximum, the safety spreading ratio would be 10 or more. If the spreading ratio is set to 10, a character or characters having the length of 2 bytes is encoded into encryption during a period.

Upon decryption, deciphered code is also broadened ten times and taken out, and the numbers of both the successive '0's and the successive '1's must be exactly 10. When there exists even one opposite bit, this is an error. The feature of the spread spectrum communication resides in that the occurrence of a communication error can be detected and corrected in the course of decryption and thus the reliability of the system can be always determined.

The above explained embodiment relates to a technique so-called direct spread. Even when it is applied to the frequency hopping, it is available when a binary code is divided by every n bits to obtain n bits code counting $2^n$ and n bits codes of m in number ($2^n \times m$) corresponds to one period.

When the enciphered code is determined by stream-encrypting while using binary code sequence obtained by the above-mentioned spread spectrum signal generating method, there is executed an exclusive OR arithmetic operation on the binary code sequence determined by the spread spectrum signal generating method and digital information which is to be encrypted, and the enciphered code determined in this manner is utilized for communication.

As explained above, according to the present invention, a large number of binary code sequence having no bias are obtained from logistic mappings which are symmetrical nonlinear mapping and from the basic mode (n=1) of nonlinear quantization observation and accordingly the specific technique which generates an SS signal most suitable in the code division multiple access (CDMA) communication system.

Further, according to the present invention, since the hardware chip such as a general purpose industrial CPU outputs binary code sequence y(t) determined when the quantization resolution n=1 as spread spectrum signal as necessary, it is possible to provide a spread spectrum signal generator as hardware.

Further, according to the present invention, it is possible to propose a stream encryption method capable of generating ciphered codes with very high secrecy, which is most suitable for using in communication for example.

Further, according to the present invention, it is possible to realize the asynchronous multiple multi user stream cipher communication with very high secrecy. More specifically, the invention exhibits extremely excellent effect that the encryption code is generated, enhanced, mixed and converted, and a user having the same spread spectrum signal generator reconstitute this code through synchronization.

Meanwhile, a digital computer is composed of sequential circuits, and is not good at changing the sequential order, but the present invention makes it possible to change the order of integer sequence by the nonlinear function and nonlinear quantization, and has successfully achieved in installing it into hardware chip such as a general purpose industrial CPU.

A new using method of hardware chip has been found in which a different value as the initial value x(0) is installed into database in each of different hardware chips.

It should be understood that many modifications and adaptations of the invention will become apparent to those skilled in the art and it is intended to encompass such obvious modifications and changes in the scope of the claims appended hereto.

What is claimed is:

1. A spread spectrum signal generation method comprising the steps of:

starting an operation by substituting an initial value x(0) to an expression (1), having a resultant value based on an expression (2) again as an input to the expression (1), determining a time series x(t)–t by repeating such operations; and, substituting a quantization resolution n=1 to an expression (3), determining an isomorphic transform and quantization based on the expression (3) in correspondence to the time series x(t)–t, determining a time series y(t)–t from the determined isomorphic transform and quantization, generating a spread spectrum signal having, as a period thereof, a binary code sequence y(t) arbitrary cut out of the time series y(t)–t, where $$\text{Logistic mapping: } x(t+1)=4x(t)\{1-x(t)\} \quad (1),$$

$$\text{Feedback: } x(t)=x(t+1) \quad (2), \text{ and}$$

Isomorphic transform and quantization:

$$y(t)=[\{2/\pi \cdot \arcsin \sqrt{x(t)}\} \cdot 2^n] \quad (3),$$

where, t is a discrete time, x(t) is an internal state of a chaos given as a real number with double-precision normalized between '0' and '1', and [ ] is an operator representing a round-off operation of a decimal fraction of a value in the [ ].

2. A spread spectrum signal generator comprising:

a program storage unit for storing a program for execution of operations depending on expressions (1) to (3), $$\text{Logistic mapping: } x(t+1)=4x(t)\{1-x(t)\} \quad (1),$$

$$\text{Feedback: } x(t)=x(t+1) \quad (2), \text{ and}$$

Isomorphic transform and quantization:

$$y(t)=[\{2/\pi \cdot \arcsin \sqrt{x(t)}\} \cdot 2^n] \quad (3)$$

where, t is a discrete time, x(t) is an internal state of a chaos given as a real number with double-precision normalized between '0' and '1', and [ ] is an arithmetic operator representing a round-off operation of a decimal fraction of a value in the [ ], a database for storing a quantization resolution n=1 and an initial value x(0); and an arithmetic processing unit for starting an operation by substituting to the expression (1) the initial value x(0) stored in the database, having a resultant value based on the expression (2) again as an input to the expression (1), determining a time series x(t)–t by repeating such operations, substituting to the expression (3) the quantization resolution n=1 stored in the database, determining an isomorphic transform and quantization based on the expression (3) in correspondence to the time series x(t)–t, determining a time series y(t)–t from the determined isomorphic transform and quantization, generating a spread spectrum signal having, as a period thereof, a binary code sequence y(t) arbitrarily cut out of the time series y(t)–t.

3. A stream encryption method capable of obtaining enciphered code by performing stream encryption using the binary code sequence obtained by the spread spectrum signal generation method according to claim 1, wherein the stream encryption is achieved by executing an exclusive OR arithmetic operation on the binary code sequence that has been obtained by the spread spectrum signal generating method according to claim 1 and digital information to be enciphered.

4. A stream enciphered codes communication method for performing stream enciphered code communication using enciphered codes obtained by the stream encryption method according to claim 3.

* * * * *